Patented Dec. 1, 1942

2,303,466

UNITED STATES PATENT OFFICE 2,303,466

POULTRY FEED

Jesse E. Hunter, Peoria, Ill., assignor to Allied Mills, Inc., Chicago, Ill., a corporation of Indiana No Drawing. Application February 15, 1940, Serial No. 318,978

9 Claims. (Cl. 99—4)

My invention relates to a poultry feed and more particularly to a poultry feed adapted to increase normal pigmentation in the skins and shanks of poultry.

It is highly desirable in the poultry industry to raise chickens, turkeys, ducks, geese, and the like which have yellow-colored or pigmented skin and shanks. Such birds, when marketed in the dressed condition, present a pleasing appearance and are able to command a higher premium than those birds which do not have any coloring matter in their skin. No means has been disclosed in the prior art whereby the desirable pigmentation of the skin and shanks of poultry may be consistently obtained and it has not been known how this desirable result may be achieved. I have now discovered that pigmentation of the skin and shanks may be regulated by adding certain substances to the poultry fattening or developing ration.

It is one object of my invention to provide a means for controlling the amount of pigment formation in the skin and shanks of poultry.

An additional object of my invention is to provide a new and useful feed ration for poultry which will produce a pronounced yellow pigmentation in the skin and shanks of a bird to which it is fed.

A further object of my invention is to produce a highly nutritive feed base ration having desirable skin and shank pigment producing characteristics.

Further and additional objects will appear from the following description and the accompanying claims.

In accordance with my present invention, the skin and shank pigment producing qualities of a poultry base feed may be greatly enhanced and more or less uniformly controlled by the incorporation of certain ingredients with standard nutrient base developing or fattening rations. Suitable ingredients are such substances as corn gluten meal or xanthophyll oil. I have discovered that the latter substance is particularly useful for the purpose. Both xanthophyll oil and corn gluten meal contain relatively large amounts of a substance or principle which causes the skin pigmentation in poultry when fed in a feed ration. It is not definitely known whether the xanthophyll or carotinoids contained in these materials are the skin pigment producing principles, but there appears to be some relationship between the skin pigmentation producing power of the feed and the high xanthophyll and carotinoid content of the substances added to the feed ration proposed in accordance with this invention. I have further discovered that the skin pigmentation producing effect of xanthophyll oil or corn gluten meal incorporated with the feed may be greatly enhanced by the addition of small quantities of certain fish oils, such as sardine oil or fortified sardine oil. The reason for this enhancement is not completely understood, since these fish oils are relatively deficient in xanthophyll and carotinoid compounds and their ability to enhance the skin pigment producing power of the feed is disproportionate to the amount of those substances in the oil.

The xanthophyll oil, which has been found to be particularly useful for increasing the skin pigment producing powers of a feed, is that oil produced as a by-product from the commercial production of zein from corn. The oil may be obtained by the solvent extraction of corn, corn products, or other materials containing relatively large amounts of xanthophyll, carotene, and/or other carotinoid compounds.

It will be clear from the above considerations that any desirable nutrient base ration may be used and mixed with the skin pigmentation producing substances herein disclosed. An example of a dry base ration containing suitable quantities of a skin pigmentation principle derivable from xanthophyll oil is as follows in parts by weight:

| | |
|---|---|
| Dried alfalfa meal | 7.0 |
| Bran | 5.0 |
| Corn meal | 42.8 |
| Dried milk | 5.0 |
| Fish meal | 5.0 |
| Meat scrap | 3.0 |
| Standard middlings | 13.0 |
| Mineral mixture | 2.0 |
| Finely ground oats | 10.0 |
| Corn gluten meal | 5.0 |
| Soy bean oil meal | 2.0 |
| Fortified sardine oil | 0.2 |
| Xanthophyll oil | 2.0 |

The poultry ration having the above composition, when fed to poultry for developing or fattening, will cause the skin of the birds to be pigmented to a distinctly yellow color. The skin pigment producing principle is largely contained in the xanthophyll oil and said principle is augmented by the fortified sardine oil, which may be omitted from the ration if desired. The xanthophyll oil and sardine oil in the ration may be varied widely. Marked skin pigmentation producing properties are imparted to the feed if as little as 0.25% of xanthophyll oil is present. The best results, however, consistent with economy in producing the feed, are obtainable when the xanthophyll oil is present in amounts of about 2% by weight. It is clear, however, that higher percentages of the xanthophyll oil may be employed if desired, for example, 3% or even 5%. The amount necessary for producing the desired effect may also depend to some extent upon the xanthophyll and carotinoid compound content of the oil. The corn gluten meal in the ration having the above formula also supplies a certain amount of the skin pigmentation principle to the feed.

A second feed ration having high skin pigmentation producing properties prepared in accordance with this invention has the following composition in parts by weight:

| | |
|---|---|
| Alfalfa meal | 6.0 |
| Yellow corn | 43.9 |
| Ground oats | 7.5 |
| Dried milk | 2.0 |
| Animal liver meal | 5.0 |
| Meal scraps | 3.0 |
| Fish meal | 3.0 |
| Wheat middlings | 8.0 |
| Wheat bran | 8.0 |
| Mineral mixture | 2.0 |
| Corn gluten meal | 10.0 |
| Sardine oil | 0.5 |
| Fortified sardine oil | 0.1 |

In the above given poultry feed ration the corn gluten meal and, to some extent, the yellow corn provide the skin pigmentation producing principle. This is enhanced by the presence of sardine oils. In other respects, this formula is quite similar to the first one presented.

It will be clearly understood that the substances containing the pigmentation producing principle may be incorporated in suitable amounts with any poultry feed containing desirable nutrients. The various ingredients contained in the feed having the above formulae are not indispensable, and various omissions, additions, or substitutions may be made. In accordance with this invention, it is principally desirable to assure that sufficient quantities of a substance containing xanthophyll and carotinoids, or other skin pigmentation producing principles, are present in the feed so that the desired skin and shank pigmentation will occur in poultry developed on the ration. It will be clear from the above considerations that other substances supplying the skin pigment producing principle may be introduced into the feed either alone or in admixture with the corn gluten meal or xanthophyll oil. Suitable materials are those which contain comparatively large amounts of oil soluble plant pigments chemically related to xanthophyll, carotene, and other carotinoids, as, for example, palm kernel meal and pimiento meal.

While two particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A poultry feed comprising a nutritive base ration and an added quantity of xanthophyll oil sufficient to impart skin pigmentation in poultry developed on said feed.

2. A poultry developing feed comprising a nutritive base ration and more than about 0.25% of a xanthophyll containing oil.

3. A poultry developing feed comprising a nutritive base ration and between 0.25% and 3.0% of a xanthophyll containing oil.

4. A poultry developing feed comprising a nutritive base ration including corn gluten meal, a fish oil, and a xanthophyll containing oil, said xanthophyll oil being present in the feed in amounts between 0.25% and 3.0% by weight.

5. A poultry developing feed comprising a nutritive base ration and skin pigmentation producing quantities of xanthophyll oil and a fish oil.

6. A poultry developing feed comprising a nutritive base ration and skin pigmentation producing quantities of xanthophyll oil and sardine oil.

7. A process of producing skin pigmentation in poultry which comprises feeding a nutritive base ration having skin pigment producing quantities of xanthophyll oil incorporated therewith.

8. A process of producing skin pigmentation in poultry which comprises feeding a nutritive base ration having skin pigment producing quantities of xanthophyll oil and a sardine oil incorporated therewith.

9. A process of producing skin pigmentation in poultry which comprises feeding a nutritive base ration having incorporated therewith between 0.25% and 3.0% by weight of a xanthophyll oil obtained as a by-product in the production of zein from corn.

JESSE E. HUNTER.